(12) United States Patent
Jain et al.

(10) Patent No.: US 12,316,904 B2
(45) Date of Patent: *May 27, 2025

(54) SYSTEM AND METHOD FOR WIRELESS MEDIA STREAMING FROM TELEVISION RECEIVER

(71) Applicant: DISH Network Technologies India Private Limited, Bangalore (IN)

(72) Inventors: Himanshu Jain, Bangalore (IN); Amit Kumar, Bangalore (IN); Ankit Gandhi, Bangalore (IN); Jayaprakash Ramaraj, Bangalore (IN)

(73) Assignee: DISH NETWORK TECHNOLOGIES INDIA PRIVATE LIMITED, Bangalore (IN)

( * ) Notice: Subject to any disclaimer, the term of this patent is extended or adjusted under 35 U.S.C. 154(b) by 0 days.

This patent is subject to a terminal disclaimer.

(21) Appl. No.: 18/753,958

(22) Filed: Jun. 25, 2024

(65) Prior Publication Data

US 2024/0348867 A1    Oct. 17, 2024

Related U.S. Application Data

(63) Continuation of application No. 17/716,923, filed on Apr. 8, 2022, now Pat. No. 12,047,636.

(51) Int. Cl.
*H04N 21/4363*    (2011.01)

(52) U.S. Cl.
CPC .................. *H04N 21/43637* (2013.01)

(58) Field of Classification Search
CPC ....... H04N 21/43637; H04N 21/41407; H04N 21/64322
See application file for complete search history.

(56) References Cited

U.S. PATENT DOCUMENTS

| | | | |
|---|---|---|---|
| 9,696,791 B2* | 7/2017 | Stirbu | H04L 69/161 |
| 11,063,708 B1 | 7/2021 | Pichaimurthy et al. | |
| 2003/0005187 A1* | 1/2003 | King-Smith | H04L 9/40 710/12 |
| 2008/0144660 A1* | 6/2008 | Godlewski | H04L 67/60 370/468 |
| 2008/0285945 A1 | 11/2008 | Rajakarunanayake et al. | |
| 2014/0201400 A1 | 7/2014 | Beel et al. | |
| 2016/0261657 A1* | 9/2016 | Bruhn | H04N 21/4331 |
| 2017/0055031 A1* | 2/2017 | Park | H04N 21/4385 |

* cited by examiner

*Primary Examiner* — Alazar Tilahun
(74) *Attorney, Agent, or Firm* — Seed IP Law Group LLP

(57) ABSTRACT

A television receiver receives media data from a media content provider. The television receiver is also connected to a wireless network. When the television receiver receives a request via the wireless network to provide media content to an electronic device over the wireless network, the television receiver adjusts the size of a socket buffer associated with a TCP/IP socket and a transmission ring buffer associated with a wireless driver.

20 Claims, 3 Drawing Sheets

SYSTEM AND METHOD FOR WIRELESS MEDIA STREAMING FROM TELEVISION RECEIVER

BACKGROUND

Technical Field

The present disclosure relates to television receivers, and more particularly to transmission of media content from television receivers.

Description of the Related Art

Many homes and businesses include television receivers. Television receivers can connect to a media content provider, such as a satellite television provider or cable television provider. The television receivers receive media content from the media content providers. The media content can include audio and video data including television programs, movies, music, and other types of media content.

Typically, the television receivers display the media content on a display that is connected to the television receivers. Such displays can include televisions, projectors, monitors, or other types of displays.

In some cases, a television receiver may also include the ability to transmit media content over a wireless network. In these cases, the television receiver may receive media content from the media content provider and may transmit the media content to an electronic device connected to the television receiver via a wireless network. However, it can be difficult to provide media content from the television receiver to an electronic device in a way that is satisfactory to a user of the electronic device.

BRIEF SUMMARY

Embodiments of the present disclosure provide a television receiver that can reliably provide media data to an electronic device over the wireless network without interruption. The television receiver receives media content from a media content provider. The television receiver is also connected to a local wireless network. Electronic devices can connect to the television receiver via the wireless network in order to request and receive media data from the television receiver. When the television receiver receives the request for media content from an electronic device, the television receiver increases the allocation of available transmission memory resources to prioritize transmission of media data. The increased transmission memory resources, and other prioritization techniques, enable the television receiver to ensure that media data is provided in an uninterrupted manner to the electronic device.

In one embodiment, the television receiver includes a processor that manages both transmission of data over the wireless network and other functions of the television receiver. The processor implements a TCP/IP stack in order to facilitate transmission of data over the wireless network. When the television receiver receives a request to stream media data over the wireless network to an electronic device, the processor allocates an increased amount of physical memory capacity to a socket buffer associated with the TCP/IP stack. This allocation of increased physical memory enables greater throughput of media data.

In one embodiment, the processor also establishes a wireless driver that drives transmission and reception of wireless data via a wireless transceiver of the television receiver. Upon receiving a request to stream media content to an electronic device, the processor allocates an increased amount of physical memory capacity to a transmission ring buffer of the wireless driver. This allocation of increased physical memory to the transmission ring buffer of the wireless driver enables the wireless driver to provide a greater throughput of media data to the wireless transceiver.

In one embodiment, the processor also ensures that the wireless driver prioritizes transmission of media data over transmission of other types of data and over reception of other types of data. The wireless driver continually checks whether media data is available to transmit via the wireless transceiver. If there is media data available for transmission, the wireless driver prioritizes transmission of the media data. If no media data is available for transmission, the wireless driver transmits other types of data or receives other types of data. In this way, media data is prioritize in a manner that ensures that an electronic device receives an uninterrupted, high quality stream of media content from the television receiver.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known systems, components, and circuitry associated with integrated circuits have not been shown or described in detail, to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Figure 1:
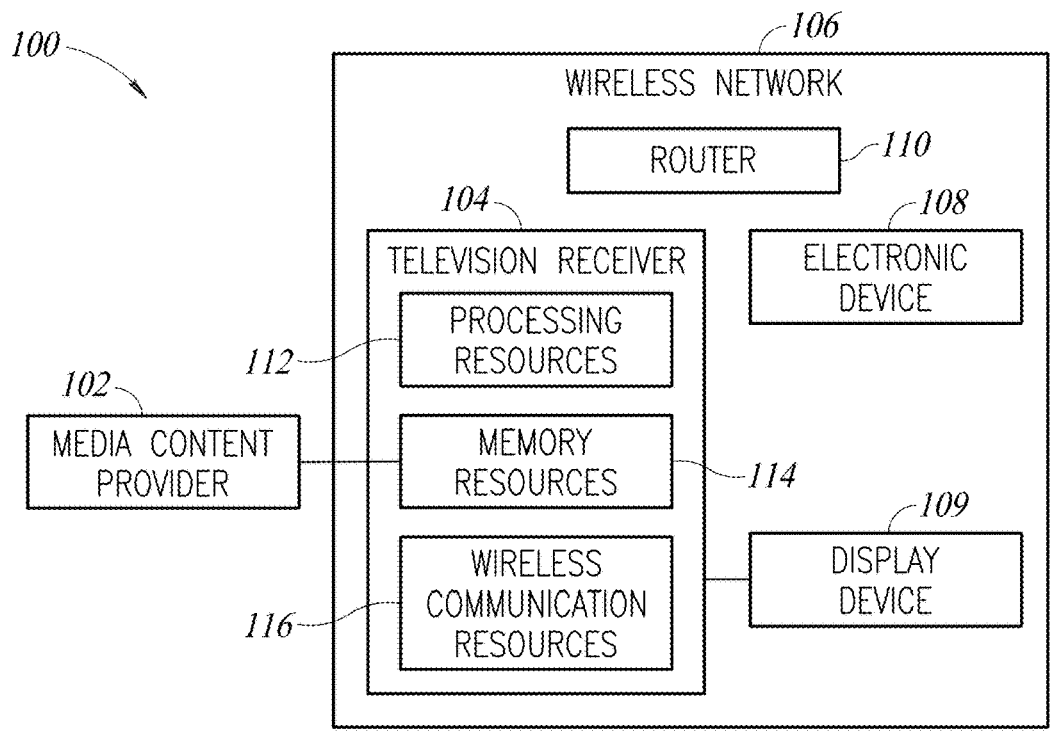
FIG. 1 is a block diagram of a media content system, according to one embodiment.

FIG. 1 is a block diagram of a communication system 100, according to one embodiment. The communication system 100 includes a media content provider 102 and a television receiver 104. The television receiver is connected to a wireless network 106. An electronic device 108 is also connected to the wireless network 106. As will be set forth in more detail below, the television receiver 104 is configured to provide reliable and uninterrupted transmission of media content to the electronic device 108 via a wireless network 106.

The media content provider 102 can include a television service provider. The television service provider can provide television content to a large number of subscribers. The television content can include television channels that provide media content such as video/audio content. The video/audio content can include television shows, movies, live sports, music, news, and other entertainment or informational media content. The audio/video content can include on-demand content, pay-per-view content, and other kinds of content.

As used herein, "media content" may refer to video/audio content. As used herein, "media data" may refer to the data, such as video and audio packets, that collectively enable a device to output the media content in audio and video form. As used herein, "media data" may refer audio and video data packets, as opposed to other types of data packets that may be sent and received.

In one embodiment, the media content provider 102 is a satellite television provider. The satellite television provider may include one or more uplink stations and one or more satellites in orbit. The uplink stations provide media content to the satellites in orbit. The satellites in orbit broadcast the media content for reception by subscribers or other users. In this case, though not shown in FIG. 1, a satellite receiver may be coupled to the television receiver 104. The satellite receiver may receive media content from the satellites and may provide the media content to the television receiver 104.

In one embodiment, the media content provider 102 is a cable television provider. The cable television provider may include a network of physical signal carrying cables, such as coaxial cable, Ethernet cable, fiber-optic cable, that collectively connect television receivers of a large number of subscribers to the cable television provider services.

In one embodiment, the wireless network includes a router 110. The router 110 establishes the wireless network 106. The television receiver 104, the display device 109, an electronic device 108 may each be connected to the wireless network via the router 110. The router 110 may process all traffic on the wireless network 106.

The router 110 may also be connected to the Internet. The router 110 may provide Internet access to the television receiver 104, the electronic device 108, and the display device 109. The television receiver 104 may receive some types of media content via the Internet. In some cases, the media content provider 102 may also be an Internet service provider. In these cases, the router 110 may be connected to the media content provider 102 and may provide Internet access to the wireless network 106 via the media content provider 102.

The display device 109 may correspond to a television or another type of device coupled to the television receiver 104 and configured to display the media content. In some cases, the display device 109 may be coupled to the television receiver 104 by a wired connection. The wired connection the television receiver 104 may provide media content to the display device 109 via the wired connection. There may be multiple display devices 109 connected to the television receiver by wired connections. In some cases, the display device 109 may not be connected to the television receiver 104 by a wired connection. In these cases, the display device 109 may be connected to the television receiver 104 via the wireless network 106.

The electronic device 108 can include a mobile phone, a tablet, a laptop computer, a desktop computer, a television, or other types of electronic devices that can output media content such as video and audio content. The electronic device 108 is connected to the wireless network 106 supported by the router 110.

The electronic device 108 can include a software application that enables the electronic device 108 to communicate with the television receiver 104 via the router 110. When a user of the electronic device 108 desires to receive media content from the television receiver 104, the user electronic device 108 can open the software application and can request that the television receiver 104 provide media content to the electronic device 108 over the wireless network. The electronic device 108 sends the request for media content to the television receiver 104 via the wireless network. The application used by the electronic device 108 can include a dedicated application associated with the television receiver 104 or the media content provider 102. Alternatively, the application can include a web browser or other type of application that may allow the user to request media content from the television receiver 104.

Although FIG. 1 illustrates the television receiver 104 and the electronic device 108 coupled to a same router 110 and wireless network 106, in practice, the electronic device 108 may be coupled to a different wireless network at a remote location and may communicate with the wireless network 106 via the Internet.

The television receiver 104 receives the request for media content from the electronic device 108. The television receiver 104 then transmits media data corresponding to the requested media content to the electronic device 108 via a wireless network 106. The electronic device 108 can then output the media content in the form of video content audio content or both video and audio content. Further details regarding the function of the television receiver 104 are provided below.

The television receiver 104 includes processing resources 112, memory resources 114, and wireless communication resources 116. The television receiver 104 utilizes these resources to perform the functions of the television receiver 104. This can include providing media content to the display device 109, transmitting media data to the electronic device 108, storing media data in the television receiver 104, communicating with the media content provider 102, receiving remote control signals from a remote control, and other functions. In one embodiment, the television receiver 104 is a set-top box.

The processing resources can include one or more computer processors. The one or more computer processors can include one or more CPUs, one or more microcontrollers, or other types of processes. The processing resources 112 can control or otherwise interface with other components of the television receiver 104. The processing resources 112 can execute software instructions in order to perform the functions of the television receiver 104.

The memory resources 114 can include one or more computer memories capable of storing data. The memory resources 114 can include read-only memory (ROM), random access memory (RAM), electrically erasable and programmable read-only memory (EEPROM), or other types of memory. The memory resources 114 can include one or more hard drives, one or more solid-state drives, one or more static random access memories (SRAM), one or more dynamic random access memory (DRAM), registers, buffers, or other types of memories.

The memory resources 114 can store software data. The software data can include an operating system, user applications, kernel data, internal software applications, and other types of stuff to a data. The processing resources 112 can read data from the memory resources 114 in order to execute and implement the operating system and other types of software applications.

The memory resources 114 can also store media data corresponding to media content. For example, the memory resources 114 can include one or more digital video recorders (DVR) or other types of memories for recording and storing media content. Such stored media content can be provided to the display device 109 or to the electronic device one via the wireless network 106, as will be described in greater detail below.

While the memory resources 114 are shown as being separate from the processing resources 112, in practice, some of the memory resources 114 are part of the processing resources 112. For example, a processor may include some amount of physical memory for implementing various functions of the processor. Other types of memory resources may be separate from or external to the processing resources 112.

The wireless communication resources 116 can include one or more wireless transceivers. The one or more wireless transceivers can include wireless chips, wireless antennas, or other types of circuits or components that can be utilized for wireless communication. The processing resources 112 can control the wireless communication resources 116 to transmit data wirelessly over the wireless network 106 and to receive data wirelessly over the wireless network 106. Such data can include media data and other types of data. The television receiver 104 can include other components and resources for performing the functions of the television receiver 104.

When transmitting media data from the television receiver 104, it is desirable to ensure that the media data is provided in a manner that allows the electronic device 108 to present the media content without interruption. For example, if a user requests to watch a television show via the electronic device 108, it is beneficial if the television receiver 104 provides the corresponding media data to the electronic device in a manner that ensures that the user is able to view the television program without interruption and without fluctuations in quality.

Transmitting high-quality media content can utilize relatively high amount of bandwidth. In a television receiver, it is possible that a processor of the television receiver may be a bottleneck to transmission of high-quality media content. This may be because the processor is responsible for performing the various functions of the television receiver as well as for driving media content to the wireless communication resources for wireless transmission. The television processor may have a limited amount of physical memory for utilization in performing the functions of the television receiver. If insufficient physical memory resources are made available for driving media data to wireless communication resources in favor of other functions of the processor, then there may be insufficient resources for driving the media data in a way that ensures uninterrupted high-quality playback on the electronic device 108.

The television receiver 104 overcome these drawbacks by dynamically increasing the allocation of physical memory of the processing resources available for transmitting data via the wireless network when media data is to be transmitted over the wireless network 106 to the electronic device 108. In one embodiment, when the television receiver 104 receives a request to provide media content wirelessly to the electronic device 108, the television receiver 106 increases the allocation of physical memory available for driving data over the wireless network 106. This helps ensure that the processing resources 104 do not become a bottleneck that inhibits transmitting the media data over the wireless network 106.

In one embodiment, the processing resources 112 of the television receiver 104 implement a user application for communication with the electronic device 108. The user application runs in a user space implemented by the processing resources 112. The user application may receive a request to provide media content to the electronic device 108. The user application may acquire the corresponding media data from memory resources 114 of the television receiver 104, from the media content provider 102 directly, or via the Internet. The user application then pushes the media data for the user space to kernel space in which the operating system runs.

The television receiver 104 has an Internet protocol (IP) address. However, each application that utilizes the wireless network 106 utilizes its own port in conjunction with a transmission control protocol/Internet protocol (TCP/IP) stack established by the processing resources 112. The TCP/IP stack includes a socket. The socket associated with the user application corresponds to the IP address of the television receiver 104 and the number of the port.

The processing resources 112 allocate physical memory for a socket buffer associated with the socket. The size of the socket buffer influences the amount of data that can be driven via the socket. When the user application indicates that media data is to be provided to the electronic device 108 via a wireless network 106, the processing resources dynamically increase the size of the socket buffer. This may mean that the processing resources dynamically increase in allocation of physical memory for the socket buffer in preparation for transmitting media data via a socket. This reduces one potential bottleneck in transmitting high-quality media data without interruption.

Another possible bottleneck for the transmission of high-quality media data to the electronic device 108 via the wireless network 106 is the wireless driver. The processing resources 112 implemented wireless driver for driving the transmission of data to the wireless communication resources 116 (e.g. a wireless transceiver) for transmission over the wireless network 106. The wireless driver also drives reception of data from the wireless communication resources 116.

The wireless driver includes a ring buffer. The ring buffer corresponds to an amount of physical memory allocated to the wireless driver for providing data to the wireless communication resources 116. The processing resources 112 can dynamically adjust the size of the ring buffer. When the user application indicates that media data is to be transmitted to the electronic device 108, the processing resources 112 can dynamically adjust the size of the ring buffer associated with the wireless driver. This increased allocation of physical memory for the wireless driver removes a potential bottleneck in transmitting high-quality media data without interruption.

The processing resources 112 can also control priorities of the wireless driver in order to ensure the transmission of high-quality media data without interruption. In one example, the processing resources can cause the wireless driver to prioritize transmission of media data over transmission or reception of all other types of data. The wireless driver can periodically check to see if media data is available for transmission. If media data is available for transmission, the wireless driver prioritizes driving the media data to the wireless communication resources 116. If there is no media data available at a given moment, then the wireless driver processes and the other types of data present. The other types of data can include data received via the wireless network 106, interrupt data, command data, or other types of data.

Utilizing the techniques described above, the television receiver 104 dynamically adjusts memory allocations and priorities in order to ensure that media data can be determined over the wireless network 106 in a way that ensures that the electronic device 108 can display or otherwise output media data with high quality and without interruption.

Figure 2:
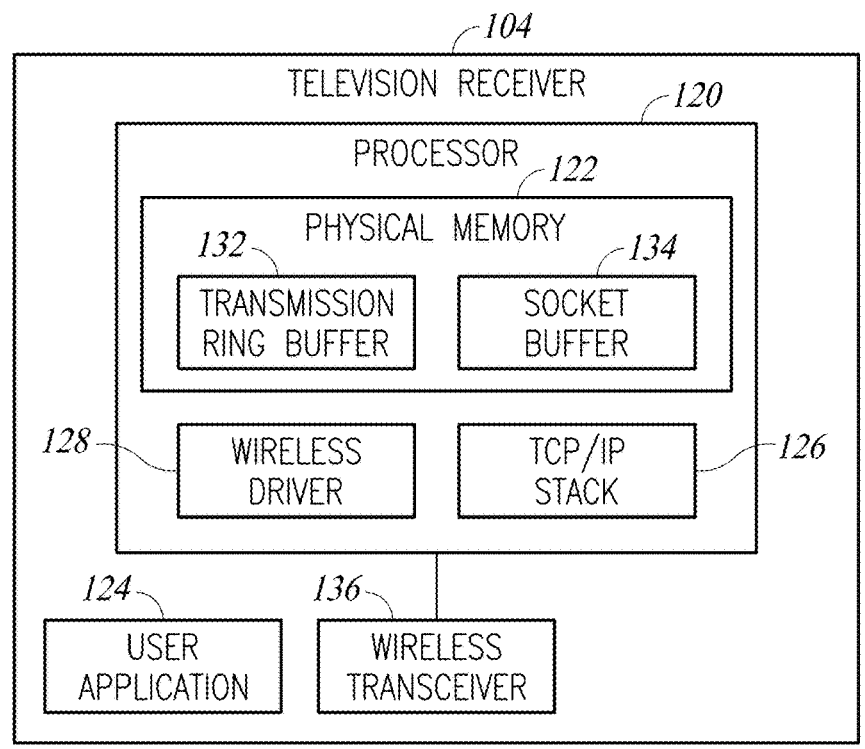
FIG. 2 is a block diagram of a television receiver, according to one embodiment.

FIG. 2 is a block diagram of a television receiver 104, in accordance with one embodiment. The block diagram of FIG. 2 illustrates hardware components and applications implemented in software by the television receiver 104.

The television receiver 104 includes a processor 120. The processor 120 can correspond to a CPU or another type processor. In practice, the television receiver 104 may include multiple processors. The processor 120 is one example of processing resources 112 of FIG. 1. The processor 120 may implement an operating system in kernel space. The processor 120 may also implement a user application 124 in user space. The user application 124 may be an application that communicates with the electronic device 108. The user application may process requests from the electronic device 108 and may push media content to the electronic device 108, as will be described in more detail below.

The processor 120 includes physical memory 122. The physical memory 122 is one example of memory resources 114 of FIG. 1. The physical memory 122 may include memory that can be dynamically utilized by the processor 120 in performing functions of the processor 120. The physical memory 122 may be utilized in implementing some aspects of software programs implemented by the processor 120.

In one embodiment, the processor 120 implements a TCP/IP stack. The TCP/IP stack is utilized for wireless communication over a wireless network 106. The TCP/IP stack is implemented as part of the kernel of the operating system of the television receiver 104. One of the layers in the TCP/IP stack is the socket associated with the user application 124. The socket corresponds to the IP address of the television receiver 104 and the port number assigned for network communication with the user application 124.

The physical memory 122 includes a socket buffer 134. The socket buffer 134 corresponds to an allocation of physical memory for the socket associated with the user applications 124. The size of the socket buffer 134 effects the overall rate at which data can be passed through the socket associated with the user application 124. The processor 120 can dynamically allocate physical memory space to the socket buffer 134, as will be described in further detail below.

The television receiver 104 also includes a wireless transceiver 136. The wireless transceiver 136 may include a wireless chip or other type of transceiver that can transmit and receive wireless data via the wireless network 106. The wireless transceiver may include one or more antennas and other circuitry for transmitting and receiving wireless data.

The processor 120 also implements a wireless driver 128. The wireless driver 128 is a software application that is utilized by the processor 120 to drive data from the TCP/IP stack to the wireless transceiver 136.

The physical memory 122 includes a transmission ring buffer 132. The transmission ring buffer corresponds to an allotment of physical memory for the wireless driver 128. The size of the transmission ring buffer 132 effects the overall rate at which data can be driven to the wireless transceiver 136 for transmission to the electronic device 108. The processor 120 can dynamically adjust the size of the ring buffer 132, as will be described in further detail below. Though not shown in FIG. 2, the physical memory may also include a receiving ring buffer for the wireless driver 128. The transmission ring buffer temporarily stores data for transmission via the wireless transceiver 136. The receiving ring buffer temporarily stores data received from the wireless transceiver 136.

When the user application 124 receives a request from the electronic device 108 to provide media content to the electronic device 108, the user applications 124 procures the corresponding media data and pushes the media data from the user space to the kernel space via the TCP/IP stack. The processor 120 increases the size of the socket buffer 134 responsive to the request to transmit media data to the electronic device 108. The processor 120 also increases the size of the transmission ring buffer 132 responsive to the request to transmit media data to the electronic device 108.

In one embodiment, the size of the socket buffer 134 is increased from a default size to a media data transmission size that is larger than the default size. In one embodiment, the default size is between 4 kB and 30 kB. In one embodiment, the media data transmission size is between 40 kB and 80 kB. Other values for the socket buffer 134 can be utilized without departing from the scope of the present disclosure.

In one embodiment, the size of the transmission ring buffer 132 is increased from a default size to a media data transmission size that is larger than the default size. In one embodiment, the default size is between 4 kB and 30 kB. In one embodiment, the media data transmission size is between 40 kB and 80 kB. Other values for the transmission ring buffer 132 can be utilized without departing from the scope of the present disclosure. In one embodiment, the processor 120 can dynamically adjust priorities of the wireless driver 128 responsive to receiving a request to transmit media data to the electronic device 108. The processor 120 can also control priorities of the wireless driver 128 in order to ensure the transmission of high-quality media data without interruption. In one example, the processing resources can cause the wireless driver 128 to prioritize transmission of media data over transmission or reception of all other types of data. The wireless driver 128 can periodically check to see if media data is available for transmission. If media data is available for transmission, the wireless driver 128 prioritizes driving the media data to the wireless communication resources 116. If there is no media data available at a given moment, then the wireless driver 128 processes and the other types of data present. The other types of data can include data received via the wireless network 106, interrupt data, command data, or other types of data.

In one embodiment, the wireless driver 128 prioritizes transmission of media data if the transmission ring buffer 132 is filled beyond a first threshold value corresponding to a threshold percentage or threshold amount of data. The prioritization of transmission of media data continues until the amount of data in the transmission ring buffer 132 falls below a second threshold value.

The wireless driver 128 drives the media data from the transmission ring buffer 132 to the wireless transceiver 136. The wireless transceiver 136 then transmits the media data to the electronic device 108 via the wireless network 106. While transmitting the media data, the wireless transceiver may also receive acknowledgment data packets or other types of data from the electronic device 108. The wireless driver 128 only processes these other types of data packets when there is no media data awaiting transmission in the transmission ring buffer 132.

As used herein, a "wireless network" may correspond to a Wi-Fi network. A "wireless transceiver" may correspond to a Wi-Fi transceiver, such as a Wi-Fi chip. A "wireless driver" may correspond to a Wi-Fi chip.

Figure 3:
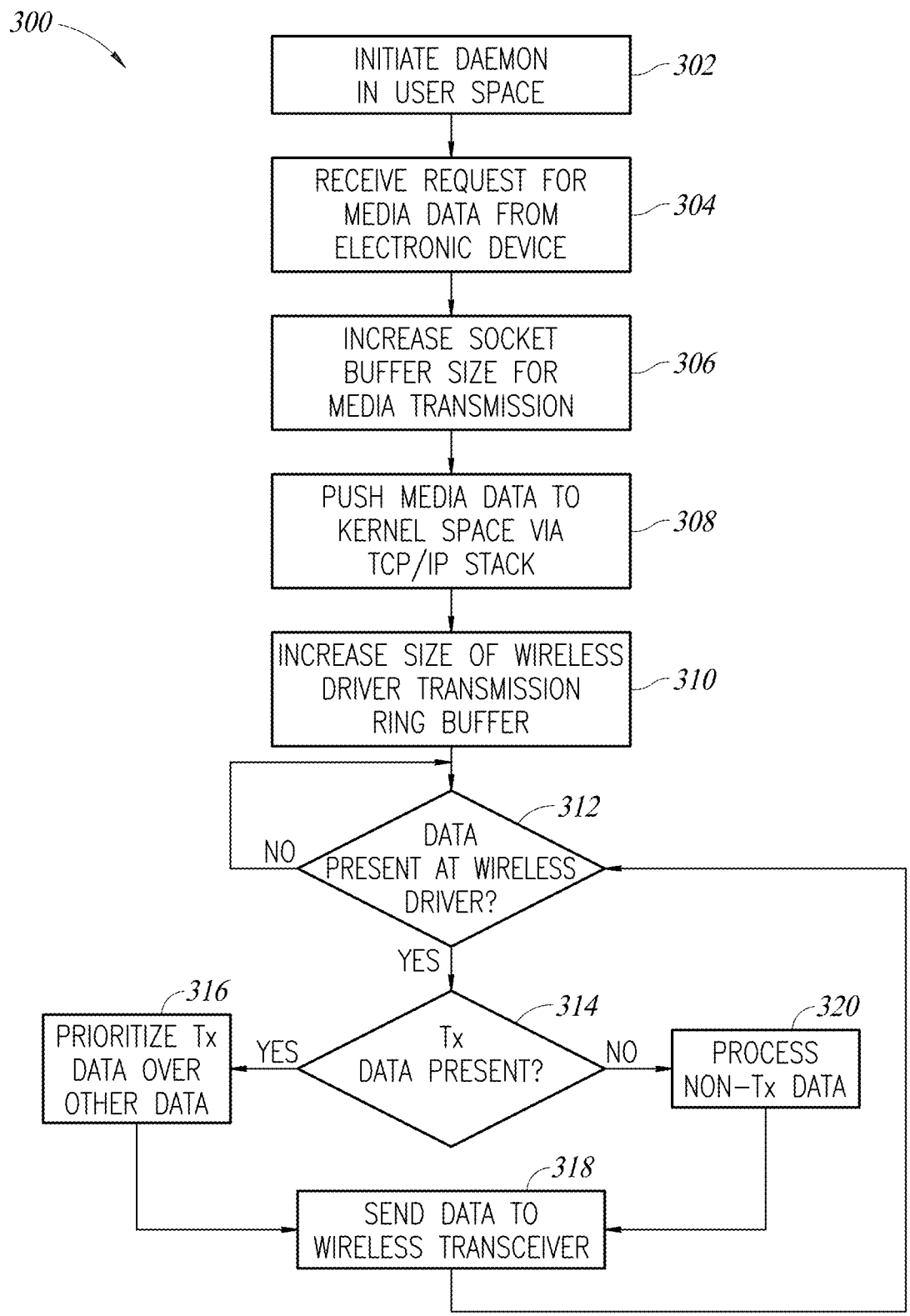
FIG. 3 is a flow diagram of a method for managing transmission of media data from a television receiver, according to one embodiment.

FIG. 3 is a flow diagram of a method 300 for operating a television receiver, in accordance with one embodiment. The method 300 can utilize systems, components, and processes described in relation to FIGS. 1 and 2. At 302, the method 300 initiates a daemon in user space. The daemon can correspond to a user application that communicates with electronic devices connected to a same wireless network as the electronic device 108. One example of a daemon is the user application 124 of FIG. 2.

At 304, the daemon receives the request for media data from an electronic device. The media data can include video and audio data corresponding to a television show, a movie, music, or other types of media data. One example of an electronic device is the electronic device 108 of FIG. 1.

At 306, the method 300 includes increasing the socket buffer size for media transmission responsive to receiving the request for media data from the electronic device. A processor operating a kernel space can implement a TCP/IP stack including a socket for the daemon. The processor increases the size of a socket buffer associated with the socket responsive to the request for media data from the electronic device. One example of a socket buffer is a socket buffer 134 of FIG. 2.

At 308, the method 300 includes pushing media data to the kernel space from the user space via the TCP/IP stack. At 310, the method 300 includes increasing the size of a transmission ring buffer of a wireless driver responsive to the request for media data from the electronic device. One example of a wireless driver is the wireless driver 128 of FIG. 2.

At 312, the wireless driver checks to see if data is present at the wireless driver. If not, then the wireless driver is checked again periodically. If data is present at the wireless driver, then at 314 the wireless driver determines whether the data includes media data for transmission. If the data includes media data for transmission, and 316, the wireless driver prioritizes the media data for transmission over other types of data. If no media data for transmission is present, then at 320 the wireless driver processes on media transmission data. At 318, the method 300 includes driving the data from the wireless buffer to the wireless transceiver. The media data is transmitted in packets. One example of a wireless transceiver is the wireless transceiver 136 of FIG. 2.

In one embodiment, the processor can also cause the wireless driver to adjust the size of the maximum transmission unit. The maximum transmission unit is the maximum size of a transmission packet. Increasing the maximum size of the transmission packets can help decrease the load on the wireless driver. Various other processes and procedures to be utilized without departing from the scope of the present disclosure.

Figure 4:
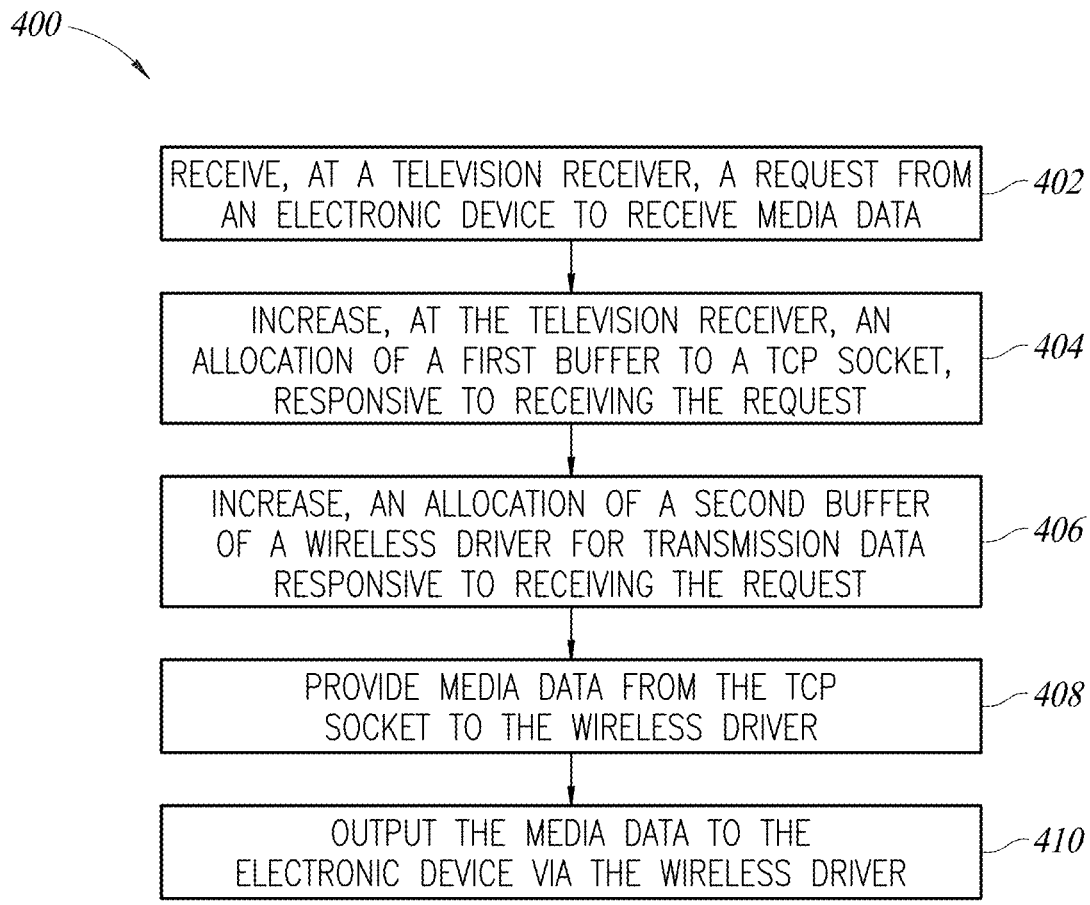
FIG. 4 is a flow diagram of a method for operating a television receiver, according to one embodiment.

FIG. 4 is a flow diagram of a method 400, in accordance with some embodiments. The method 400 can utilize components, systems, and processes described in relation to FIGS. 1-3. 402, the method 400 includes receiving, at a television receiver, a request to receive media data from an electronic device. At 404, the method 400 includes increasing, at the television receiver, an allocation of a first buffer to a TCP socket, responsive to receiving the request. At 406, the method 400 includes increasing, an allocation of a second buffer of a wireless driver to transmission data responsive to receiving the request. At 408, the method 400 includes providing media data from the TCP socket to the wireless driver. At 410, the method 400 includes outputting the media data to the electronic device via the wireless driver. The method 400 can include other steps without departing from the scope of the present disclosure.

In one embodiment, a method includes receiving, at a television receiver, a request to receive media data from an electronic device and increasing, at the television receiver, an allocation of a first buffer to a TCP/IP socket, responsive to receiving the request. The method includes increasing, an allocation of a second buffer of a wireless driver to transmission data responsive to receiving the request, providing media data from the TCP/IP socket to the wireless driver, and outputting the media data to the electronic device via the wireless driver.

In one embodiment, a television receiver includes one or more computer memories storing software instructions and one or more processors coupled to the one or more computer memories and configured to execute the software instructions. Executing the software instructions causes the one or more processors to perform a process. The process includes receiving, at the television receiver from an electronic device, a request to provide media data to the electronic device and increasing, responsive to the request, a size of a socket buffer associated with a TCIP/IP socket. The process includes increasing, responsive to the request, a size of a transmission buffer of a wireless driver responsive to receiving the request.

In one embodiment, a television receiver includes a first buffer associated with a TCP/IP socket, a second buffer associated with a wireless driver, and a wireless transceiver configured to receive, from an electronic device, a wireless request to provide media data to the electronic device. The television receiver includes a processor configured to increase, responsive to the request, a size of the first buffer and to increase, responsive to the request, a size of the second buffer responsive to receiving the request.

The various embodiments described above can be combined to provide further embodiments. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
receiving, by a content receiver, a request to transmit media data from the content receiver to an electronic device;
determining, by the content receiver, whether a wireless driver has media data to transmit to the electronic device;
in response to determining that the wireless driver has media data to transmit to the electronic device, causing, by the content receiver, the media data to be transmitted from the content receiver to the electronic device via the wireless driver; and
in response to determining that the wireless driver has no media data to transmit to the electronic device, causing, by the content receiver, the wireless driver to process other data.

2. The method of claim 1, wherein determining whether the wireless driver has media data to transmit to the electronic device comprises:
determining, by the content receiver, whether data is present at the wireless driver; and
in response to determining that data is present at the wireless driver, determining, by the content receiver, whether the wireless driver has media data to transmit to the electronic device.

3. The method of claim 1, further comprising:
increasing, by the content receiver, a size of a socket buffer responsive to receiving the request.

4. The method of claim 1, further comprising:
increasing, by the content receiver, a size of a transmission buffer of the wireless driver responsive to receiving the request.

5. The method of claim 1, further comprising:
adjusting a maximum size of a transmission packet that transmits the media data to the electronic device.

6. The method of claim 1, wherein causing the media data to be transmitted from the content receiver to the electronic device comprises:
prioritizing transmission of the media data to the electronic device over transmission of other data.

7. The method of claim 1, wherein causing the media data to be transmitted from the content receiver to the electronic device comprises:
prioritizing transmission of the media data to the electronic device over transmission of other data until an amount of the media data falls below a threshold.

8. The method of claim 1, wherein causing the media data to be transmitted from the content receiver to the electronic device comprises:
determining if an amount of the media data exceeds a first threshold;
in response to determining that the amount of media data exceeds the first threshold, prioritizing transmission of the media data to the electronic device;
while the transmission of the media data is being prioritized, determining if the amount of the media data falls below a second threshold; and
in response to determining that the amount of the media data falls below the second threshold, ceasing the prioritized transmission of the media data to the electronic device.

9. The method of claim 1, wherein causing the media data to be transmitted from the content receiver to the electronic device comprises:
outputting the media data from a transmission buffer to a wireless transceiver of the content receiver; and
outputting the media data from the wireless transceiver to the electronic device.

10. The method of claim 1, wherein causing the media data to be transmitted from the content receiver to the electronic device comprises:
prioritizing transmission of the media data to the electronic device over reception of other data.

11. A content receiver, comprising:
a transceiver configured to wirelessly transmit data to an electronic device;
at least one memory configured to store computer instructions; and
at least one processor configured to execute the computer instructions to:
receive a request to transmit media data from the content receiver to the electronic device;
determine whether the wireless driver has media data to transmit to the electronic device;
in response to determining that the wireless driver has media data to transmit to the electronic device, transmit, using the transceiver, the media data to the electronic device via the wireless driver; and
in response to determining that the wireless driver has no media data to transmit to the electronic device, cause the wireless driver to process other data.

12. The content receiver of claim 11, wherein at least one processor determines whether the wireless driver has media data to transmit to the electronic device by being configured to execute the computer instructions to:
determine whether data is present at the wireless driver; and
in response to determining that data is present at the wireless driver, determine whether the wireless driver has media data to transmit to the electronic device.

13. The content receiver of claim 11, wherein at least one processor is configured to further execute the computer instructions to:
increase a size of a socket buffer responsive to receiving the request.

14. The content receiver of claim 11, wherein at least one processor is configured to further execute the computer instructions to:
increase a size of a transmission buffer of the wireless driver responsive to receiving the request.

15. The content receiver of claim 11, wherein at least one processor is configured to further execute the computer instructions to:
adjust a maximum size of a transmission packet that transmits the media data to the electronic device.

16. The content receiver of claim 11, wherein at least one processor transmits the media data to the electronic device by being configured to execute the computer instructions to:
prioritize transmission of the media data to the electronic device over transmission of other data.

17. The content receiver of claim 11, wherein at least one processor transmits the media data to the electronic device by being configured to execute the computer instructions to:
prioritize transmission of the media data to the electronic device over transmission of other data until an amount of the media data falls below a threshold.

18. The content receiver of claim 11, wherein at least one processor transmits the media data to the electronic device by being configured to execute the computer instructions to:
determine if an amount of the media data exceeds a first threshold;

in response to determining that the amount of media data exceeds the first threshold, prioritize transmission of the media data to the electronic device;

while the transmission of the media data is being prioritized, determine if the amount of the media data falls below a second threshold; and in response to determining that the amount of the media data falls below the second threshold, cease the prioritized transmission of the media data to the electronic device.

19. The content receiver of claim 11, wherein at least one processor transmits the media data to the electronic device by being configured to execute the computer instructions to:

prioritize transmission of the media data to the electronic device over reception of other data.

20. A non-transitory computer-readable storage medium that stores instructions that, when executed by a processor in a computing system, cause the processor to perform actions, the actions comprising:

receiving a request to transmit media data from the content receiver to an electronic device;

determining whether a wireless driver has media data to transmit to the electronic device;

in response to determining that the wireless driver has media data to transmit to the electronic device, causing the media data to be transmitted from the content receiver to the electronic device via the wireless driver; and in response to determining that the wireless driver has no media data to transmit to the electronic device, causing the wireless driver to process other data.

* * * * *